United States Patent Office 3,014,863
Patented Dec. 26, 1961

3,014,863
PREPARATION OF WELL COMPLETION AND SERVICING FLUID
Gerald G. Priest, Houston, Tex., assignor, by mesne assignments, to Jersey Production Research Company, Tulsa, Okla., a corporation of Delaware
No Drawing. Filed Nov. 18, 1957, Ser. No. 696,913
10 Claims. (Cl. 252—8.55)

The present invention is directed to a method for preparing an emulsified well completion and servicing fluid. More particularly, the invention is directed to a method for preparing an emulsified well completion and servicing fluid which is stable in wells at temperatures below about 190° F. In its more specific aspects the invention is directed to preparation of a heat stable well completion and servicing fluid which does not detrimentally affect subsurface earth formations on contact therewith.

The present invention may be briefly described as a method for preparing an emulsified completion and servicing fluid for use in wells at temperatures below 190° F. In preparing the improved completion and servicing fluid an aqueous solution is formed by dissolving a corrosion inhibitor in water. Following the dissolving of the corrosion inhibitor in the water, a weighting agent is then dissolved in the water containing the corrosion inhibitor whereby heat is liberated in the solution by the weighting agent when it is of an exothermic nature to raise the temperature of the solution to a temperature above 100° F. Under some conditions it may be desirable to dissolve in the water prior to dissolving the corrosion inhibitor and the weighting agent a film strengthening agent. Thereafter, the solution is cooled to a temperature below about 100° F. when the weighting agent is exothermic and an emulsifying agent is added to and dissolved in the cooled solution. The cooling step may not be required when the weighting agent does not raise the temperature above about 100° F. An oily medium is added to the solution and the solution and the oily medium are agitated sufficiently to form a stable emulsion.

An important feature of the present invention lies in the specific sequence in which the improved fluid is formed. Thus, unles sthe components of the emulsions are added or admixed in the critical sequence, a stable fluid is not formed. Thus, the film strengthening agent is first added to the aqueous phase to form a solution. Next, the water soluble corrosion inhibitor is added to the solution and then the weighting agent and finally the emulsifying agent prior to admixing with the oily phase.

A particular feature of the present invention is cooling the solution to a temperature below about 100° F. when an exothermic weighting agent has been employed and prior to dissolving the emulsifying agent in the solution and adding the oily medium and agitating the cooled solution and oily medium to form a stable emulsion. Without employing this particular sequence of operations and cooling when using the exothermic weighting agent, the emulsions formed are unstable at temperatures below 190° F. and do not give satisfactory results.

It is desirable to provide an emulsion which may be either heavier or lighter than the normal drilling fluid used in drilling wells, and the emulsion of the present invention may have a density in pounds per gallon in the range from about 7 to about 18 pounds per gallon. The emulsion where lighter than the drilling fluid may have a suitable viscosity sufficient to displace the drilling mud and to prevent displacement thereof by the drilling mud. For example, the viscosity of an emulsion prepared in accordance with the present invention may range from about 10 to about 4000 centipoises at 60° F.

The oily phase of the emulsion of the present invention may suitably be a liquid hydrocarbon, such as crude petroleum and fractions thereof, such as gasoline, kerosene, gas oil, diesel oil and the like. Suitably, the hydrocarbon may have a viscosity at 60° F. of less than about 40 centipoises. While the oily phase may suitably be a hydrocarbon, other oily materials may be employed such as halogenated hydrocarbon derivatives, and the like.

There are many water-soluble, inorganic weighting agents which find use in the practice of the present invention among which may be mentioned, by way of illustration and not by way of limitation, alkali metal carbonates, alkali metal chlorides, zinc chloride, calcium chloride, and sodium chloride which are particularly useful. Examples of the water-soluble inorganic weighting agents are presented in the following table:

TABLE I

*Water soluble inorganic compounds suitable as weighting agents*

| Name | Formula | Specific gravity |
|---|---|---|
| Aluminum bromide [1] | $AlBr_3$ | 3.01 |
| Aluminum chloride [1] | $AlCl_3$ | 2.44 |
| Aluminum iodide [1] | $AlI_3$ | 3.98 |
| Ammonium bromide | $NH_4Br$ | 2.33 |
| Ammonium iodide | $NH_4I$ | 2.51 |
| Ammonium nitrate | $NH_4NO_3$ | 1.72 |
| Ammonium phosphate, dibasic | $(NH_4)_2HPO_4$ | 1.62 |
| Antimony trichloride [1] | $SbCl_3$ | 3.14 |
| Antimony trifluoride [1] | $SbF_3$ | 4.38 |
| Barium acetate | $Ba(C_2H_3O_2)_2$ | 2.47 |
| Barium bromide | $BaBr_2$ | 4.78 |
| Barium iodide dihydrate | $BaI_2.2H_2O$ | 5.15 |
| Barium iodide hexanydrate | $BaI_2.6H_2O$ | 5.0 |
| Barium nitrite | $Ba(NO_2)_2$ | 3.23 |
| Cadmium acetate | $Cd(C_2H_3O_2)_2$ | 2.34 |
| Cadmium bromate monohydrate | $Cd(BrO_3)_2.H_2O$ | 3.8 |
| Cadmium bromide | $CdBr_2$ | 5.2 |
| Cadmium chlorate | $Cd(ClO_3)_2$ | 2.3 |
| Cadmium chloride | $CdCl_2$ | 4.05 |
| Cadmium iodide | $CdI_2$ | 5.67 |
| Cadmium nitrate tetrahydrate | $Cd(NO_3)_2.4H_2O$ | 2.45 |
| Cadmium sulfate heptahydrate [1] | $CdSO_4.7H_2O$ | 2.48 |
| Calcium bromate monohydrate | $Ca(BrO_3)_2.2H_2O$ | 3.33 |
| Calcium bromide [1] | $CaBr_2$ | 3.35 |
| Calcium chloride [1] | $CaCl_2$ | 2.15 |
| Calcium iodide [1] | $CaI_2$ | 3.96 |
| Calcium nitrate | $Ca(NO_3)_2$ | 2.36 |
| Cupric bromate hexahydrate | $Cu(BrO_3)_2.6H_2O$ | 2.58 |
| Cupric bromide | $CuBr_2$ | 2.8 |
| Cupric chloride | $CuCl_2$ | 3.05 |
| Cupric nitrate hexahydrate | $Cu(NO_3)_2.6H_2O$ | 2.07 |
| Ferric chloride [1] | $FeCl_3$ | 2.81 |
| Ferric nitrate hexahydrate | $Fe(NO_3)_3.6H_2O$ | 1.68 |
| Ferric sulfate nonahydrate [1] | $Fe_2(SO_4)_3.9H_2O$ | 2.1 |
| Ferrous bromide [1] | $FeBr_2$ | 4.64 |
| Ferrous chloride [1] | $FeCl_2$ | 2.70 |
| Lead acetate trihydrate | $Pb(C_2H_3O_2)_2.3H_2O$ | 2.55 |
| Lead chlorate monohydrate | $Pb(ClO_3)_2.H_2O$ | 4.04 |
| Lead nitrate | $Pb(NO_3)_2$ | 4.53 |
| Lithium bromide [1] | $LiBr$ | 3.46 |
| Lithium iodide [1] | $LiI$ | 4.06 |
| Magnesium bromide | $MgBr_2$ | 3.72 |
| Magnesium iodide | $MgI_2$ | 4.25 |
| Manganese bromide | $MnBr_2$ | 4.39 |
| Manganese chloride tetrahydrate | $MnCl_2.4H_2O$ | 2.01 |
| Manganese iodide | $MnI_2$ | 5.01 |
| Nickel bromide | $NiBr_2$ | 4.64 |
| Nickel nitrate hexahydrate | $Ni(NO_3)_2.6H_2O$ | 2.05 |
| Potassium acetate | $KC_2H_3O_2$ | 1.8 |
| Potassium carbonate [1] | $K_2CO_3$ | 2.29 |
| Potassium fluoride | $KF$ | 2.48 |
| Potassium iodide | $KI$ | 3.13 |
| Potassium nitrite | $KNO_2$ | 1.92 |
| Potassium phosphate | $K_3PO_4$ | 2.56 |
| Sodium bisulfate | $NaHSO_4$ | 2.74 |
| Sodium bromide | $NaBr$ | 3.20 |
| Sodium chlorate | $NaClO_3$ | 2.49 |
| Sodium chloride | $NaCl$ | 2.16 |
| Sodium hydroxide [1] | $NaOH$ | 2.13 |
| Sodium iodide | $NaI$ | 3.67 |
| Sodium nitrate | $NaNO_3$ | 2.26 |
| Sodium nitrite | $NaNO_2$ | 2.17 |
| Sodium phosphate monobasic | $NaH_2PO_4.2H_2O$ | 1.91 |
| Zinc bromide [1] | $ZnBr_2$ | 2.56 |
| Zinc chloride [1] | $ZnCl_2$ | 2.91 |
| Zinc iodide [1] | $ZnI_2$ | 4.66 |
| Zinc nitrate hexahydrate | $Zn(NO_3)_2.6H_2O$ | 2.06 |
| Zinc sulfate [1] | $ZnSO_4$ | 3.74 |

[1] Exothermic.

In forming the emulsions of the present invention, an emulsifying agent is suitably employed which will provide an emulsion of the desired heat stability. The emulsifying agent is suitably the tall oil ester of polyoxyethylene sorbitol.

It is desirable and sometimes preferable to employ a film strengthening agent as well as the emulsifying agent. The film strengthening agent gives strength to the film between the oil phase and the water phase of the emulsion. The water soluble salts of lignin sulfonic acids such as sodium lignosulfonates and the Orzans and Polyfons serve both as film strengthening and emulsifying agents. Other film strengthening agents include the alkaline metal salt, alkaline earth metal salt or ammonium salt of lignosulfonic acids. Purified lignosulfonic acids may be used in forming the alkali metal salt of lignosulfonic acids. Such salts are known to the trade as the Polyfons and may have from about 3% to about 33% of alkali metal sulfonate groups. Other film strengthening agents may include the ammonium salts of lignosulfonic acids such as those known to the trade as Orzans. An amount of film strengthening agent in the range between about 0.10 and about 10 grams per 100 ml. of the aqueous phase should be employed where desirable.

Other compounds which may serve both as film strengthening agents and as emulsifying agents in preparing the well completion fluids of the present invention may include butylene-maleic acid copolymer, polyacrylates, sulfonated polystyrene, and sulfonated phenolformaldehyde condensation product or polymer.

The emulsion of the present invention will suitably consist essentially of from about 5 percent to about 95 percent by volume of water with a preferred range from about 20 percent to about 80 percent by volume of water, while the oily phase will contain from about 5 percent to about 95 percent of the emulsion with a preferred range from about 20 to 80 volume percent of the emulsion being the oily phase.

In the present invention the oily phase will contain an amount of tetrachloroethylene no less than about 1 percent by volume of the oily phase. Suitably the oily phase may consist essentially of tetrachloroethylene and may be 100 percent tetrachloroethylene. However, it may be desirable and preferred to employ from about 10 percent to 50 percent by volume of the oily phase as consisting of tetrachloroethylene.

The emulsifying agents of the types illustrated are suitably employed in the present invention in an amount in the range from about 0.5 to about 20 grams per 100 ml. of the external phase of the emulsion. The percent by weight of the inorganic weighting agent or salt dissolved in the aqueous or water phase may suitably range from about 1 percent up to about saturation.

The corrosion inhibitor employed in the practice of the present invention is preferably sodium chromate although other water soluble inhibitors may be used. While sodium chromate is the preferred corrosion inhibitor employed in preparing the present well completion fluids, other corrosion inhibitors may be useful. Among the water-soluble corrosion inhibitors besides sodium chromate may be mentioned tributyl phosphate, calcium hydroxide, Polyrad 1110–A, and F–126. Polyrad 1110–A is a product of reaction between ethylene oxide and a high molecular weight primary amine. F–126 is principally the ammonium salt of perfluorocaprylic acid. Other water-soluble corrosion inhibitors may be used, such as those known to the trade as Corexit 40, 730, and 70, all of which are fatty acid amides of high molecular weight amines, and also propargyl alcohol.

The corrosion inhibitors may be employed in a small but sufficient amount, sufficient to inhibit the corrosivity to ferrous metal tubing and surfaces. An amount of corrosion inhibitor dissolved in the water phase of the emulsion may range from about 0.001 to about 5 percent by weight of said phase.

The Orzans are a new series of surface active chemicals derived from the by-products of wood pulp by the sulfite process using an ammonia base. In this process, wood chips consisting of about 90 percent western hemlock and 10 percent white fir are placed into a digester containing ammonium bisulfite and excess sulfur dioxide. The mixture is then cooked for about 8 hours at a temperature of about 290° to 300° F., while a pressure of 70 to 80 p.s.i. is maintained within the digester. After the cooking period, the mixture is filtered to separate the wood pulp from the bisulfite liquor.

Orzan A is obtained by concentrating the liquor by evaporation to about 50 percent solids, and then spray-drying the concentrated liquor. Orzan A, therefore, is an unaltered byproduct of the pulping process containing ammonium lignin sulfonate and wood sugars.

Orzan S is a sodium salt of lignin sulfonate and is obtained by adjusting the concentrated ammonium bisulfite liquor to pH 7.0–7.5 with sodium hydroxide. At a pH of 7.0–7.5 the excess ammonia is driven off and the concentrated liquor is spray dried to obtain a free flowing powder.

The Orzans AH0, AH1, AH2, and AH3 are made by partially polymerizing the lignin sulfonate units present in Orzan A, increasing their average molecular weight. The member having the highest molecular weight is Orzan AH3.

The Polyfons are a new series of surface active chemicals based on lignin obtained as a by-product of pulping wood chips using the kraft process. In the kraft or sulfate process, the lignin is rendered soluble by digesting wood chips at about 160° to 180° C. with a mixture of one part of sodium sulfide and two parts of sodium hydroxide as a 5 percent solution. From the kraft black liquor the lignin, together with some hemicellulose, is precipitated by acidification with mineral acid. The lignin obtained in this manner is purified and then sulfonated to provide the various lignosulfonates such as Polyfon H, XQ, O, T, R, and F.

A more complete description of processes used in the isolation of lignin and the various lignin sulfonates, i.e., the kraft, soda, and sulfite processes, is given in a book entitled "Cellulose and Cellulose Derivatives" by E. Ott, H. Spurlin, and M. Grafflin, Interscience Publishers, Inc., New York, Ed. 2., Part 2, pages 524–545.

The well completion fluids prepared in accordance with the present invention are quite useful in wells as completion fluids and as perforating fluids. For example, the compositions are useful as completion fluids to protect perforations from contamination by the drilling fluids and other fluids which may be found in a well bore. For example, if perforation operations are conducted, and it is desirable to rework the well at a vertically spaced apart zone in the well, it may be desirable to protect the existing perforations while the operation is being conducted in the other zone in the well. In that event, the existing perforations would be protected or blanketed by an emulsion of the present invention, while these operations, such as perforating, cementing, treating, fracturing, and the like, were conducted at a vertically spaced apart location.

Likewise, the well completion fluids prepared in accordance with the present invention are useful as perforating fluids in that the perforations do not become plugged with debris from the well or with any other material from the formation. In other words, by perforating in an emulsion prepared in accordance with the present invention, not only are the formations prevented from being damaged, but the perforations remain clean of material which might result in a productive hydrocarbon formation being overlooked.

The well completion fluids prepared in accordance with the present invention may also be suitably used as fracturing fluids. In other words, where there is a formation of a low permeability and it is desirable to open up a channel therein, the completion fluids of the present invention may be pumped under high pressure into the formation to cause a lifting of the over-burden and thereafter allow an increase in permeability and production of the hydrocarbons contained in the fractured formation.

There are many uses of the well completion fluids prepared in accordance with the present invention which will occur to the skilled workman. It is contemplated that the completion fluids prepared in accordance with the present invention may be employed to blanket or protect perforations or formations which are exposed in a well while operations are conducted at another location in the well. Likewise, it is contemplated that the existing perforations or exposed faces of formations may be protected while an operation is conducted where the exposed face exists or where the perforations exist.

The emulsions of the nature described and prepared amount of a corrosion inhibitor. The oil phase is then added to the aqueous phase with sufficient mixing to provide a stable emulsion. For example, the emulsion may be best prepared by slowly adding the oil phase to the water phase while agitating the water phase. High speed blending equipment may be used to provide the agitation necessary for good emulsions. Impeller mixing devices or centrifugal pumps equipped with a choke in the outflow line of the pump will provide sufficient agitation in preparing the emulsion. Other pumping or mixing assemblies may be used provided sufficient mechanical energy is available to disperse the oil into the water phase.

In order to illustrate the invention further, comparisons were made of emulsions prepared in accordance with the present invention and emulsions prepared using a different sequence. The results of these comparisons are presented in Table II.

TABLE II

*Properties of emulsions prepared by different methods*

| Fluid No. | Aqueous phase, vol. percent | Composition of aqueous phase | | | | Oil phase | | Emulsifier | | Properties of emulsions | | |
|---|---|---|---|---|---|---|---|---|---|---|---|---|
| | | Film strengthening agent | | Weighting agent | | Identity | Vol. percent | Identity | G./100 ml. aqueous phase | Density lb./gal. | Fluid loss at 78° F. cc./30 min. | Remarks |
| | | Identity | G./100 ml. | Identity | Weight percent | | | | | | | |
| 7 | 60 | Saltkem[1] | 0.5 | [2]$CaCl_2$ | 40 | [4]Diesel oil | 40 | [3]OX-298 | 2.0 | 9.6 | 2.4 | Stable at 180° F. |
| 8 | 50 | ---do--- | 0.5 | [2]$CaCl_2$ | 40 | [4]Diesel Oil | 25 | [3]OX-298 | 2.0 | 11.0 | 2.0 | Do. |
| | | | | | | $C_2Cl_4$ | 25 | | | | | |
| 9 | 50 | ---do--- | 0.5 | [2]$CaCl_2$ | 40 | [4]$C_2Cl_4$ | 50 | [3]OX-298 | 2.0 | 12.5 | 2.2 | Do. |
| 10 | 60 | Saltkem[2] | 0.5 | [1]$CaCl_2$ | 40 | [4]Diesel oil | 40 | [3]OX-298 | 2.0 | 9.6 | *19.0 | Unstable at 180° F. |
| 11 | 50 | ---do--- | 0.5 | [1]$CaCl_2$ | 40 | ---do--- | 25 | [3]OX-298 | 2.0 | 11.0 | *22.2 | Do. |
| | | | | | | $C_2Cl_4$ | 25 | | | | | Do. |
| 12 | 50 | ---do--- | 0.5 | [1]$CaCl_2$ | 40 | [4]$C_2Cl_4$ | 50 | [3]OX-298 | 2.0 | 12.5 | *34.6 | Do. |

*Emulsion.

NOTE.—(a) Saltkem is a proprietory name for sodium lignosulfonate. (b) OX-298 is a proprietory name for the tall oil ester of polyoxyethylene sorbitol. (c) The superscripts show the order of addition of the components of the emulsions to the two phases.

herein in accordance with the present invention are very useful in well completion operations as have been described at temperatures up to 190° F. The preparation of these emulsions as outlined provides a stable low fluid loss and controllable density completion fluid by using the sequence of operations as set out herein. In short, in preparing the emulsion each component of the well completion and servicing fluid is incorporated into the oily phase or the aqueous phase of the emulsion before the two phases are mixed together. For example, the aqueous phase of the emulsion is prepared to contain a film strengthening agent, a corrosion inhibitor, a weighting agent, and an emulsifying agent. To obtain the desirable and stable emulsion, the components of the aqueous phase are dissolved in the water in the following order:

(1) A film strengthening agent;
(2) Corrosion inhibitor;
(3) Weighting agent; and
(4) Emulsifying agent.

The exothermic or heat liberating weighting agent causes the temperature of the aqueous phase to rise to above about 100° F. It is important in the method of preparation described herein to cool the aqueous phase to a temperature below about 100° F. before the emulsifying agent is added. Otherwise the properties of the emulsion or well completion and servicing fluid may be undesirable. In short, the method of preparation of the emulsion of the present invention resides in a critical sequence of operations wherein the film strengthening agent is dissolved in the water phase before the inorganic weighting agent is added and then cooling the aqueous phase before the addition of the emulsifying agent, it being understood that the aqueous phase will also have dissolved in it, prior to addition of the weighting agent, a sufficient Emulsions 7, 8 and 9 illustrate the preferred method for preparing the low temperature emulsion. Saltkem is dissolved in fresh water followed by the weighting agent and the solution allowed to cool. The emulsifier, OX-298, is then dissolved and the oil phase then emulsified into the aqueous phase. This emulsion is stable at 180° F. for 24 hours and has a fluid loss in the range of 2.0 to 2.4 cc. API.

When the order of addition was changed, as illustrated in emulsions 10, 11, and 12, wherein the weighting agent was dissolved in the water first followed by the Saltkem, OX-298, and the oil phase, resulted in emulsions that were unstable at 180° F. and the fluid loss was in the range from 19.0 to 34.6 cc. API.

It is to be pointed out that emulsions prepared as described herein are quite useful in well completion and servicing operations if temperatures not above 190° F. are encountered. These well completion and servicing fluids prepared in accordance with the present invention are heat stable and noncorrosive at elevated temperatures up to 190° F. Such high temperatures may be encountered in oil and/or gas wells ranging in depth from 6000 feet up to about 25,000 feet with usual operations conducted from about 6000 to about 14,000 feet, although the depth of the well may vary depending on the area in which the well is drilled. Temperatures up to 190° F. may be encountered in wells up to 6000 feet and temperatures not above 190° F. may be encountered in wells of greater depth specified herein.

The nature and objects of the present invention having been completely described and illustrated, what I wish to claim as new and useful and to secure by Letters Patent is:

1. A method for preparing a stable, low fluid loss emulsified completion and servicing fluid for use in wells at temperatures below 190° F. which consists of forming an aqueous solution by dissolving in water a corrosion inhibitor and an exothermic weighting agent in sequence whereby heat is liberated in said solution by said exothermic weighting agent to raise the temperature of the solution to above 100° F., cooling the solution to a temperature below about 100° F., adding to and dissolving tall oil ester of polyoxyethylene sorbital as an emulsifying agent in the cooled solution, and then adding an oily medium to the cooled solution while agitating the cooled solution and oily medium to form a stable emulsion.

2. A method in accordance with claim 1 in which the inorganic weighting agent is solid calcium chloride.

3. A method for preparing a stable, low fluid loss emulsified completion and servicing fluid for use in wells at temperatures below 190° F. which consists of forming an aqueous solution by dissolving in water a film strengthening agent, a corrosion inhibitor and an exothermic weighting agent in sequence whereby heat is liberated in said solution by said exothermic weighting agent to raise the temperature of the solution to above 100° F., cooling the solution to a temperature below about 100° F., adding to and dissolving tall oil ester of polyoxyethylene sorbitol as an emulsifying agent in the cooled solution, and then adding an oily medium to the cooled solution while agitating the cooled solution and oily medium to form a stable emulsion.

4. A method for preparing a stable, low fluid loss emulsified completion and servicing fluid for use in wells at temperatures below 190° F. which consists of forming an aqueous solution by dissolving in water a film strengthening agent, a corrosion inhibitor and an exothermic weighting agent in sequence whereby heat is liberated in said solution by said exothermic weighting agent to raise the temperature of the solution to above 100° F., cooling the solution to a temperature below about 100° F., adding to and dissolving tall oil ester of polyoxyethylene sorbitol as an emulsifying agent in the cooled solution, and then adding an oily medium comprising tetrachloroethylene to the cooled solution while agitating the cooled solution and oily medium to form a stable emulsion.

5. A method for preparing a stable, low fluid loss emulsified completion and servicing fluid for use in wells at temperatures below 190° F. which consists of forming an aqueous solution by dissolving in water a corrosion inhibitor and an exothermic weighting agent in sequence whereby heat is liberated in said solution by said exothermic weighting agent to raise the temperature of the solution to above 100° F., the corrosion inhibitor being added in an amount in the range from about 0.001% to about 5% by weight of the water and the weighting agent being added in an amount in the range from about 1% by weight up to about saturation of the water; cooling the solution to a temperature below about 100° F., adding to and dissolving tall oil ester of polyoxyethylene sorbitol as an emulsifying agent in an amount in the range from about 0.5 to about 20 grams per 100 ml. of the water in the cooled solution, and then adding an oily medium to the cooled solution while agitating the cooled solution and oily medium to form a stable emulsion comprised of from about 5% to about 95% by volume of water and from about 5% to about 95% by volume of oily medium.

6. A method in accordance with claim 5 in which a film strengthening agent in an amount in the range from about 0.1% to about 10% is dissolved in the water prior to the corrosion inhibitor and weighting agent.

7. A method for preparing a stable, low fluid loss emulsified completion and servicing fluid for use in wells at temperatures below 190° F. which consists of forming an aqueous solution by dissolving in water sodium lignosulfonate as a film strengthening agent, a corrosion inhibitor and an exothermic weighting agent in sequence whereby heat is liberated in said solution by said exothermic weighting agent to raise the temperature of the solution to above 100° F., cooling the solution to a temperature below about 100° F., adding to and dissolving tall oil ester of polyoxyethylene sorbitol as an emulsifying agent in the cooled solution, and then adding a liquid hydrocarbon to the cooled solution while agitating the cooled solution and oily medium to form a stable emulsion.

8. A method for preparing a stable, low fluid loss emulsified completion and servicing fluid for use in wells at temperatures below 190° F. which consists of forming an aqueous solution by dissolving in water a film strengthening agent, a solid corrosion inhibitor and a solid exothermic weighting agent in sequence whereby heat is liberated in said solution by said exothermic weighting agent to raise the temperature of the solution to above 100° F., cooling the solution to a temperature below about 100° F., adding to and dissolving tall oil ester of polyoxyethylene sorbitol as an emulsifying agent in the cooled solution, and then adding an oily medium to the cooled solution while agitating the cooled solution and oily medium to form a stable emulsion.

9. A method for preparing a stable, low fluid loss emulsified completion and servicing fluid for use in wells at temperatures below 190° F. which consists of forming an aqueous solution by dissolving in water a film strengthening agent, a corrosion inhibitor and an inorganic exothermic weighting agent in sequence whereby heat is liberated in said solution by said exothermic weighting agent to raise the temperature of the solution to above 100° F., cooling the solution to a temperature below about 100° F., adding to and dissolving tall oil ester of polyoxyethylene sorbitol as an emulsifying agent in the cooled solution, and then adding an oily medium containing a liquid hydrocarbon and tetrachloroethylene to the cooled solution while agitating the cooled solution and oily medium to form a stable emulsion.

10. A method in accordance with claim 9 in which the inorganic weighting agent is solid calcium chloride.

References Cited in the file of this patent
UNITED STATES PATENTS

| | | |
|---|---|---|
| 1,829,705 | Walker | Oct. 27, 1931 |
| 2,564,753 | Cox | Aug. 21, 1951 |
| 2,661,334 | Lummus | Dec. 1, 1953 |
| 2,764,242 | Rohrback et al. | Sept. 25, 1956 |
| 2,805,722 | Morgan et al. | Sept. 10, 1957 |
| 2,894,584 | Birdwell et al. | July 14, 1959 |
| 2,898,294 | Priest et al. | Aug. 4, 1959 |